Nov. 28, 1967  G. BOTELLO ETAL  3,355,148
FISH CABLE TOOL
Filed Oct. 15, 1965  7 Sheets-Sheet 1
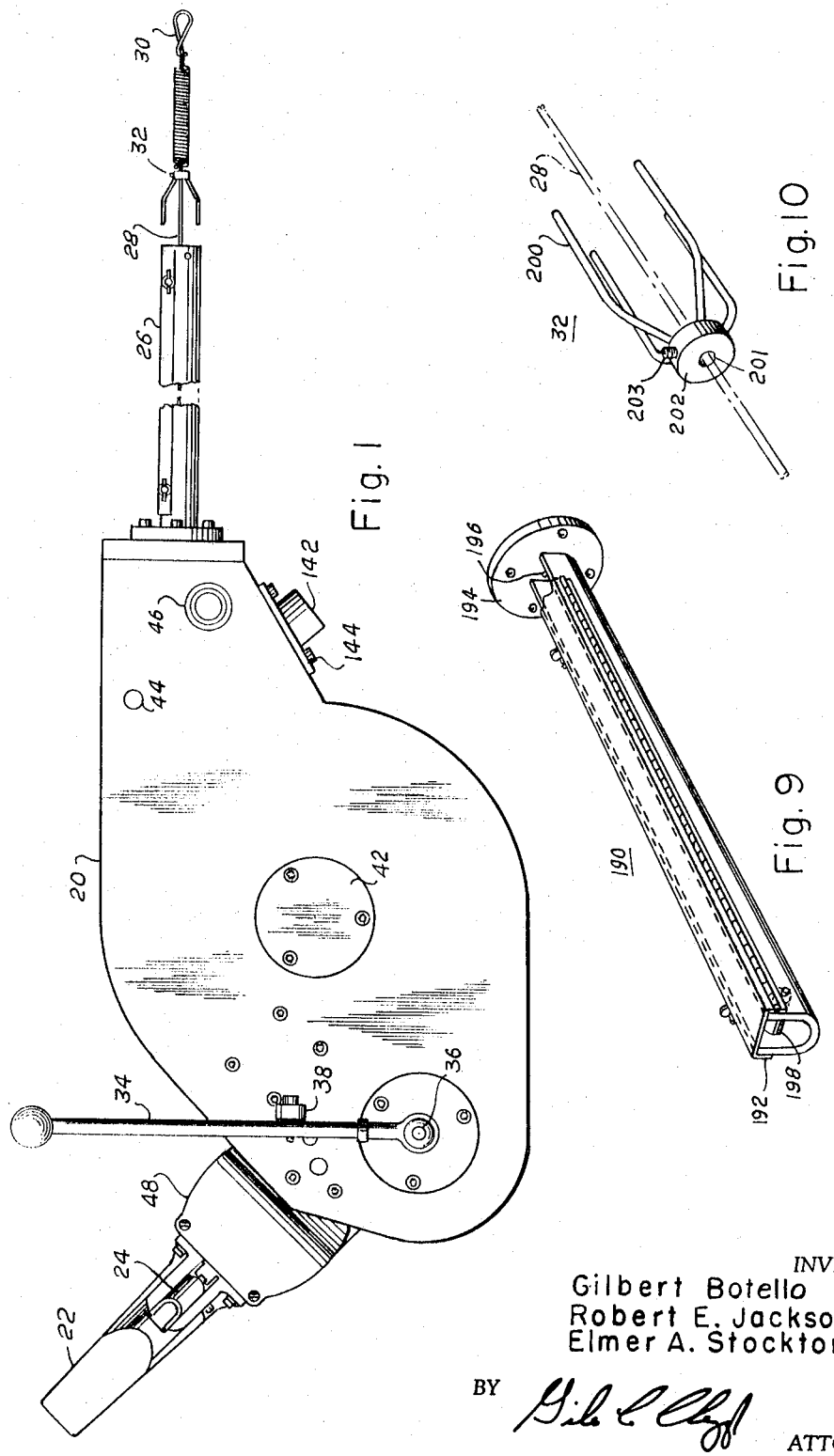
INVENTORS
Gilbert Botello
Robert E. Jackson
Elmer A. Stockton
BY *Gilbert C. Cliff*
ATTORNEY Nov. 28, 1967  G. BOTELLO ETAL  3,355,148
FISH CABLE TOOL
Filed Oct. 15, 1965  7 Sheets-Sheet 2
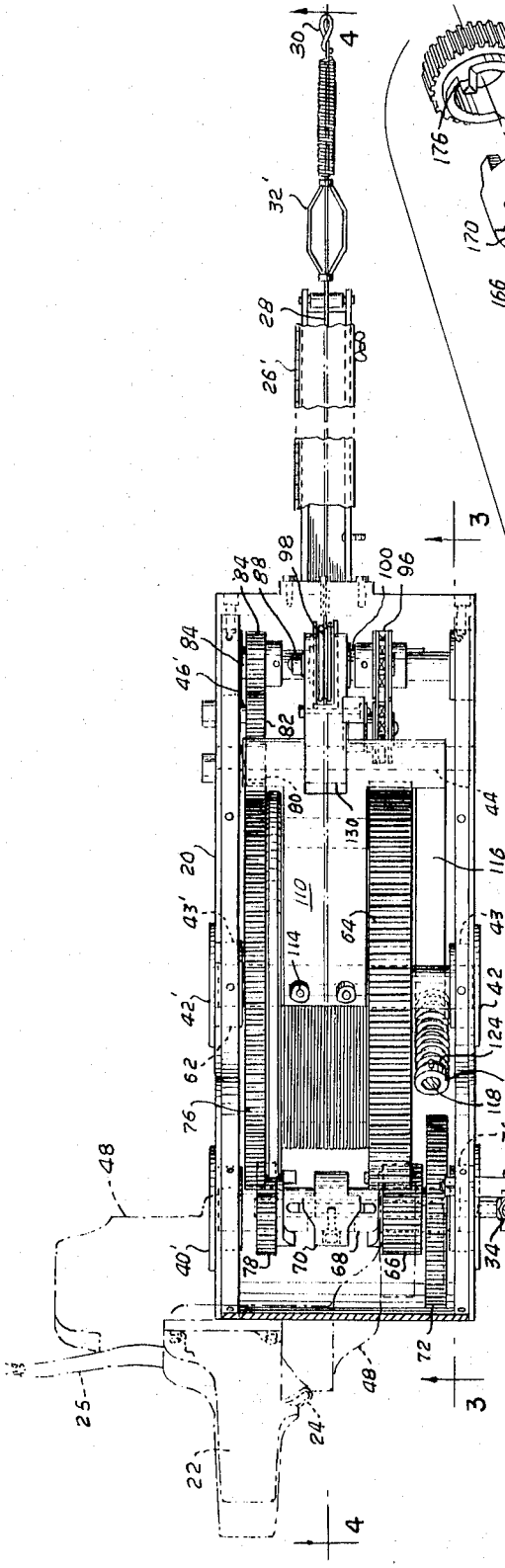
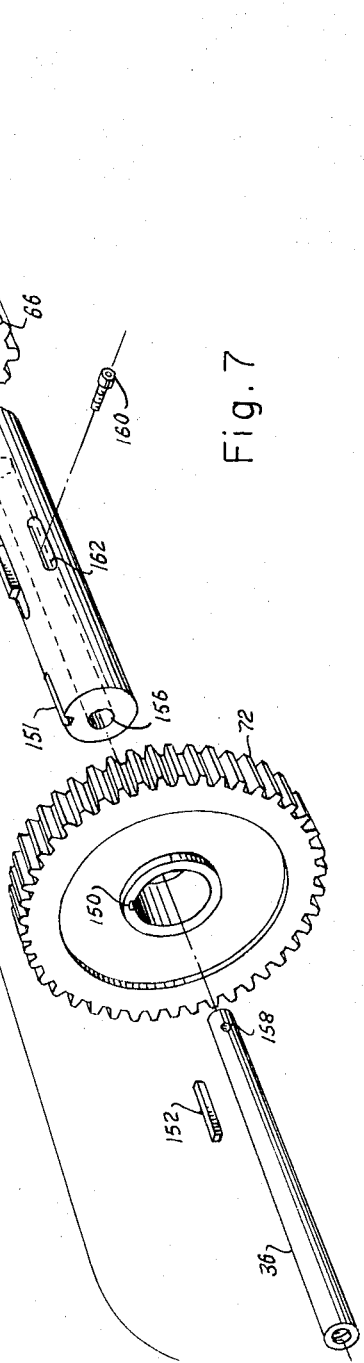
INVENTORS
Gilbert Botello
Robert E. Jackson
Elmer A. Stockton
BY
ATTORNEY

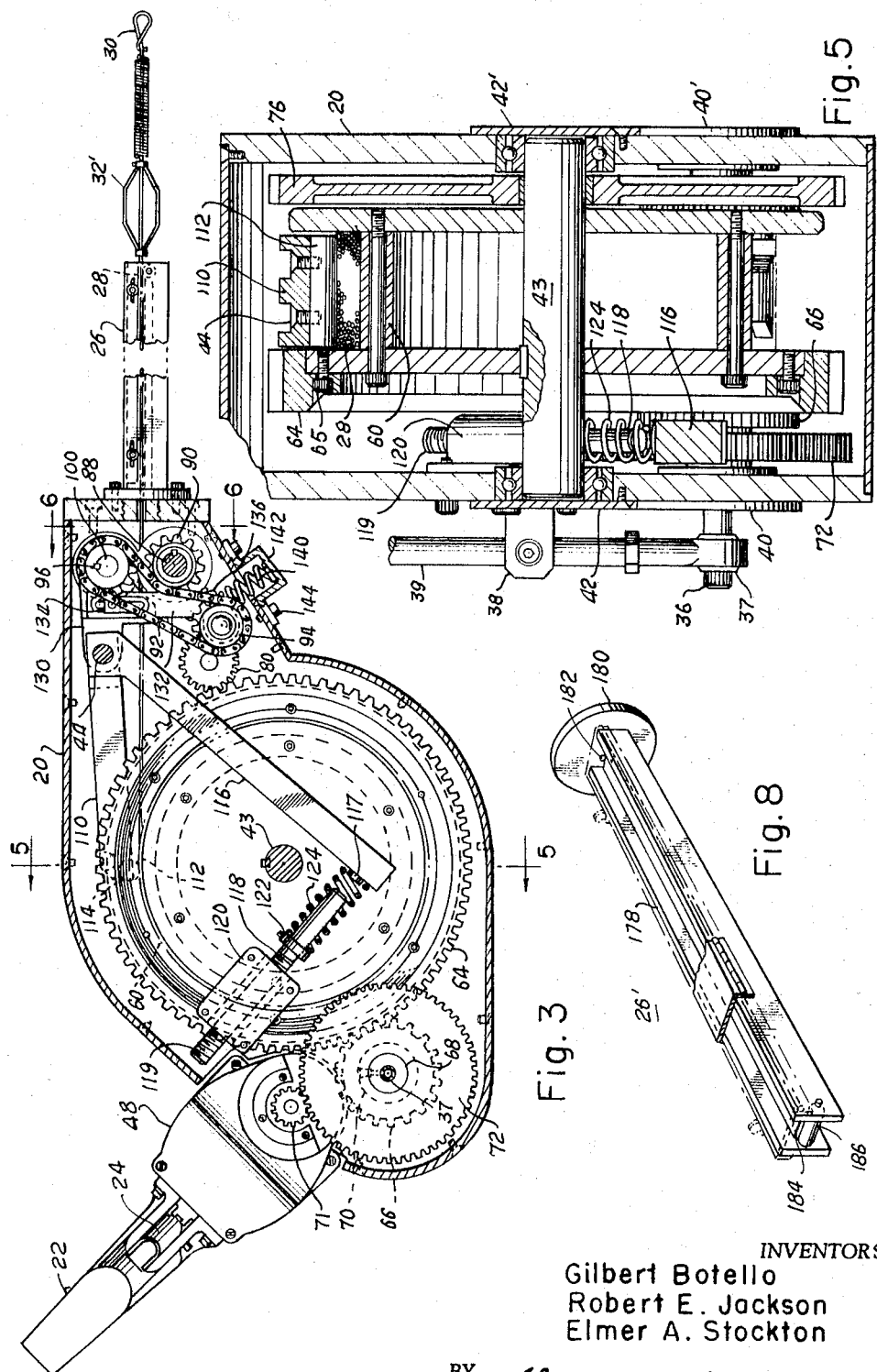

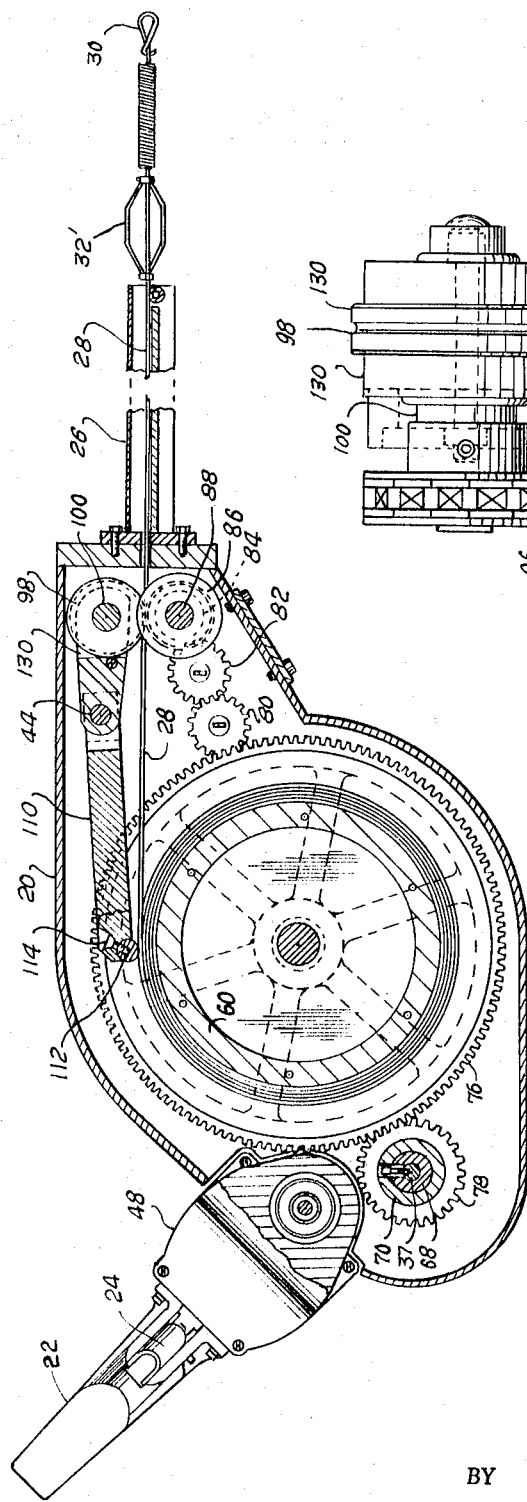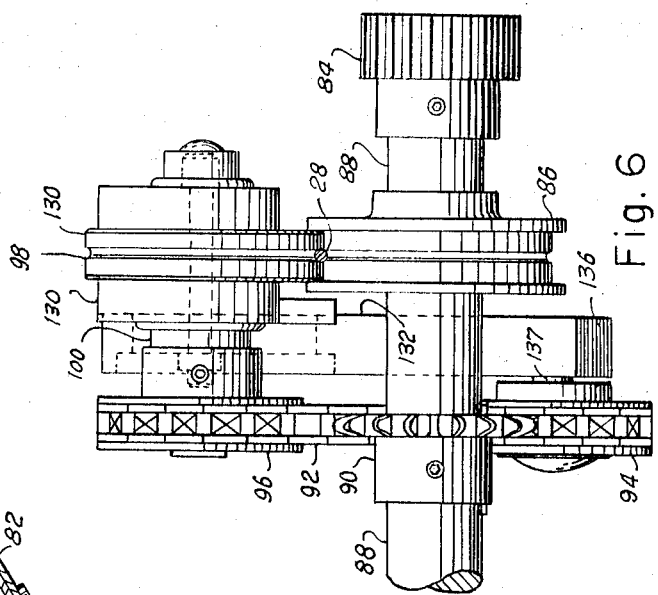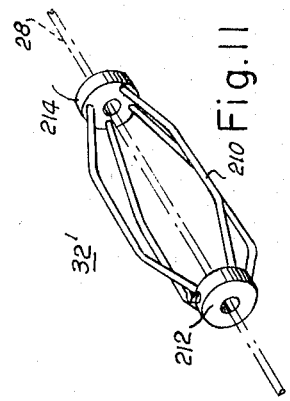
INVENTORS
Gilbert Botello
Robert E. Jackson
Elmer A. Stockton
ATTORNEY

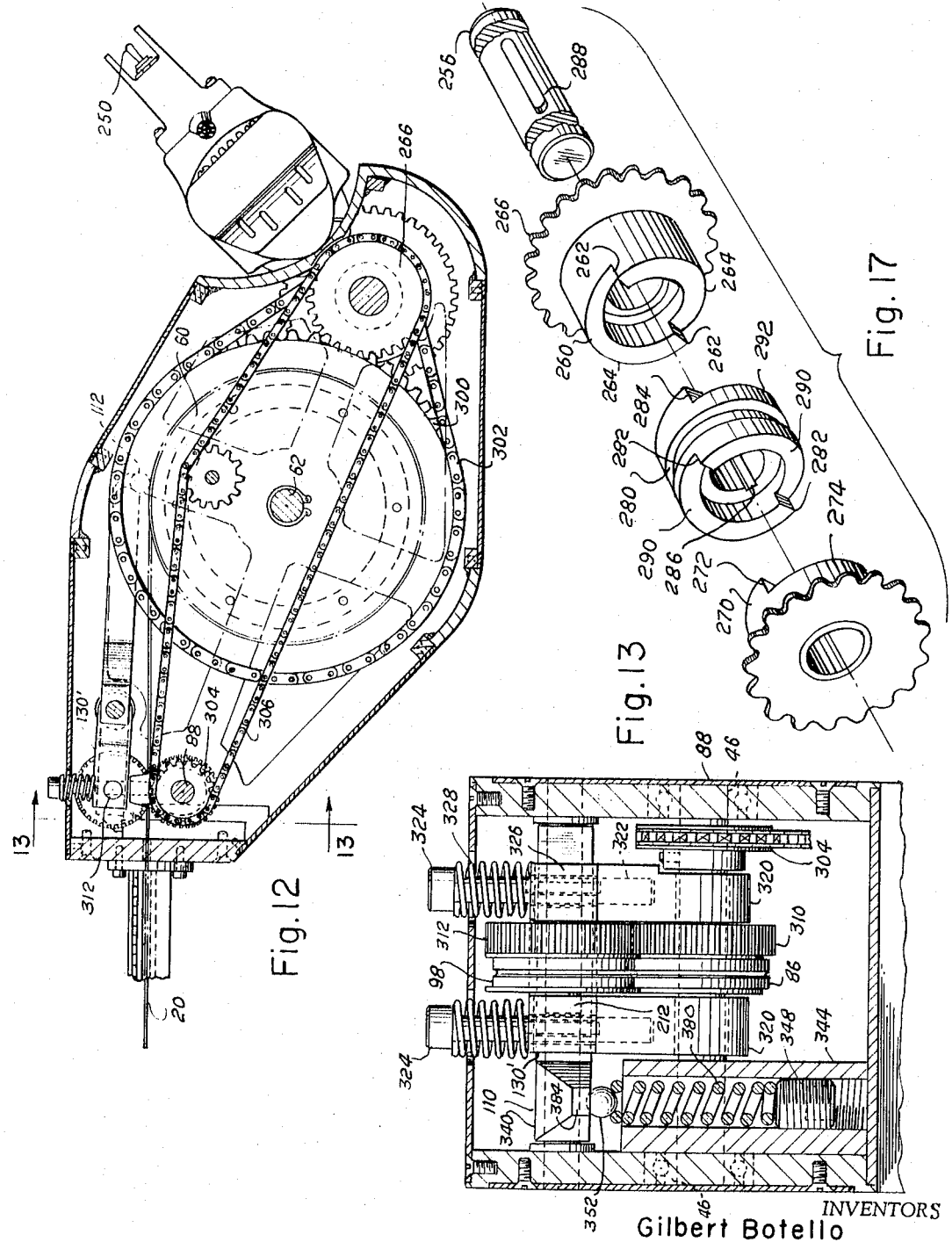

Nov. 28, 1967    G. BOTELLO ETAL    3,355,148
FISH CABLE TOOL
Filed Oct. 15, 1965    7 Sheets-Sheet 6
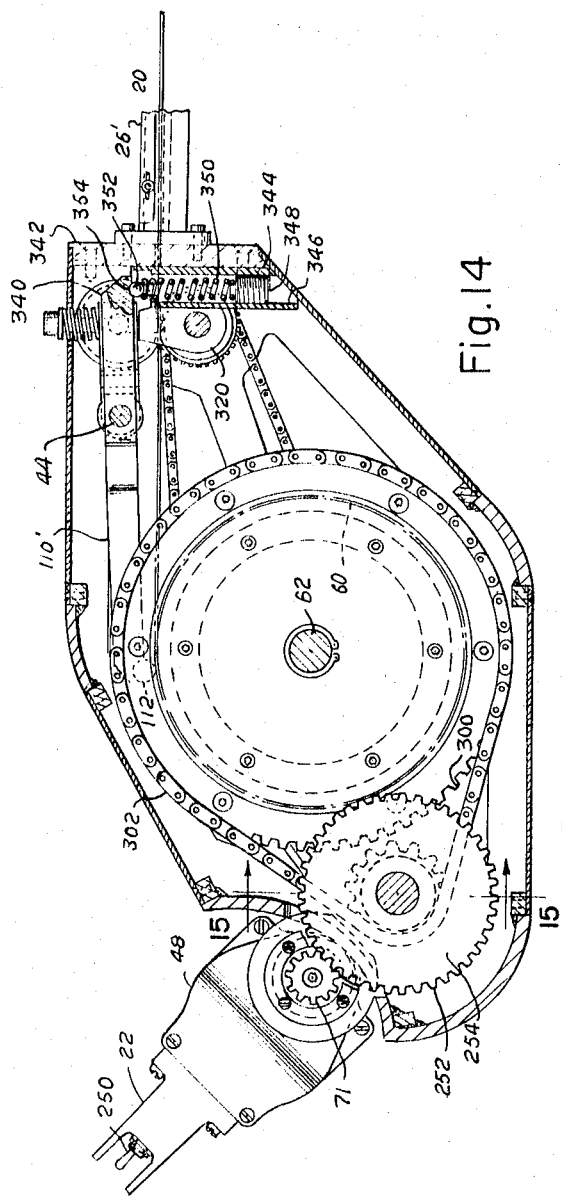
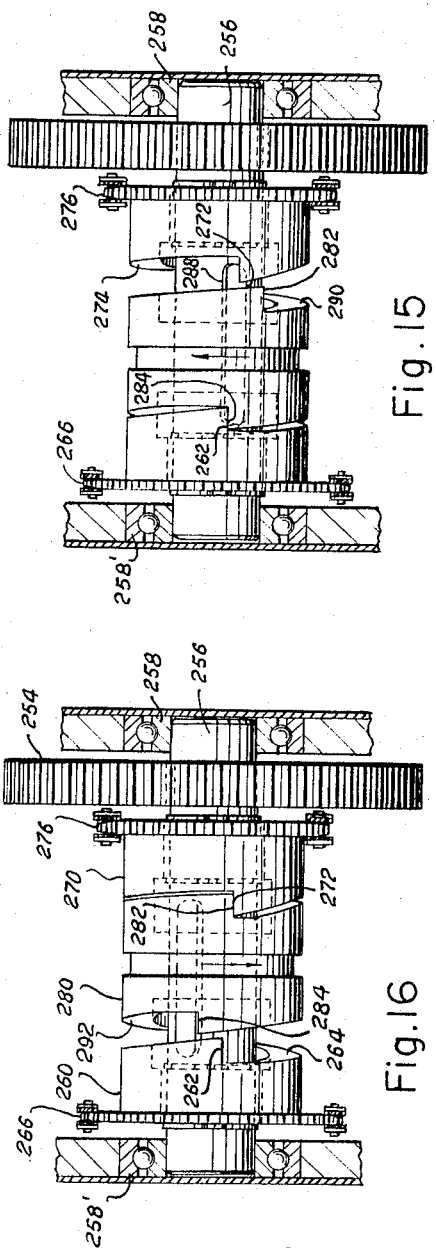
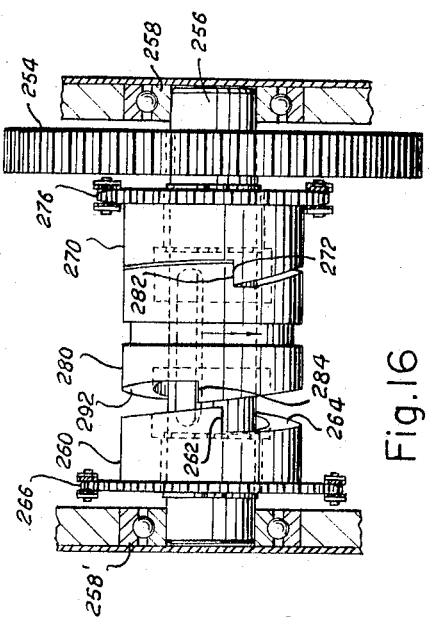
INVENTORS
Gilbert Botello
Robert E. Jackson
Elmer A. Stockton
BY
ATTORNEY

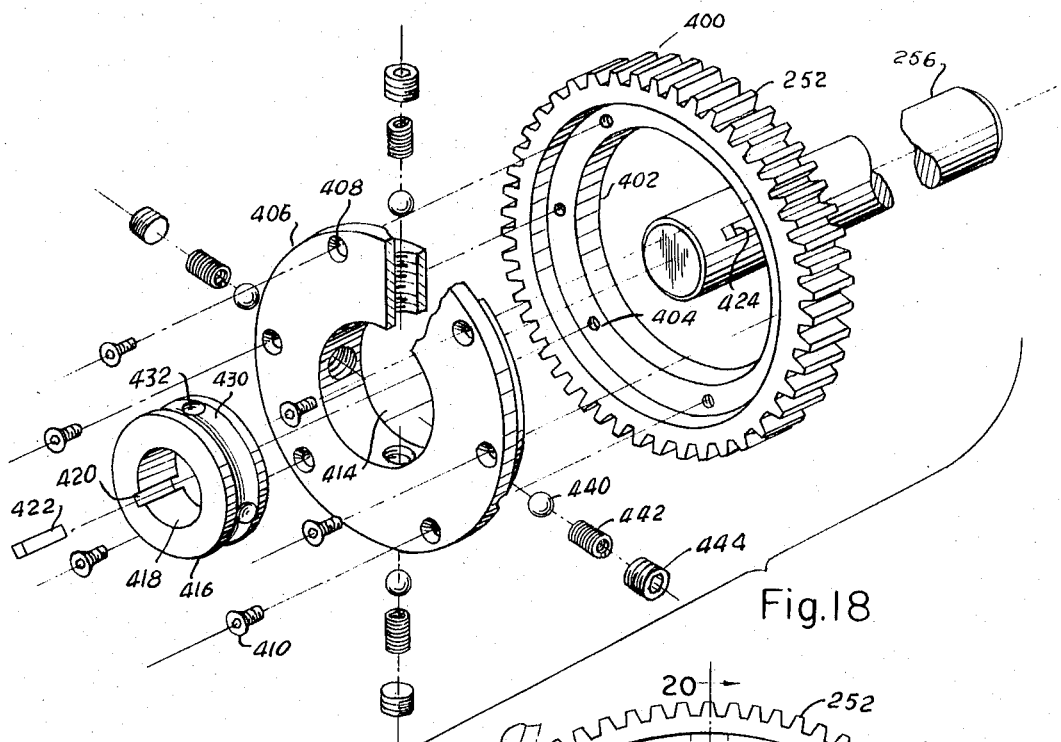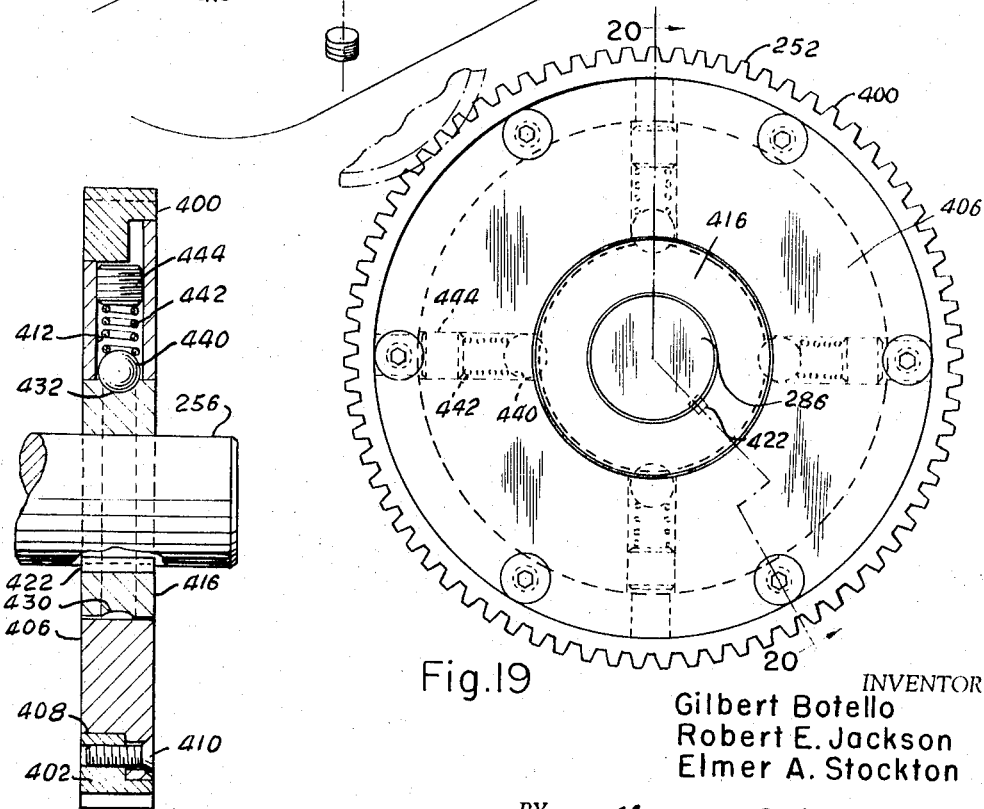

United States Patent Office 3,355,148
Patented Nov. 28, 1967

3,355,148
FISH CABLE TOOL
Gilbert Botello, 1912 Prichard Lane, Dallas, Tex. 75217, and Robert E. Johnson and Elmer A. Stockton, Dallas, Tex.; said Johnson and said Stockton assignors to said Botello
Filed Oct. 15, 1965, Ser. No. 496,290
21 Claims. (Cl. 254—134.3)

ABSTRACT OF THE DISCLOSURE

The invention disclosed is that of a fish cable tool in which the fish cable is carried on a drum. A pair of driving rollers is used for driving the fish cable from the drum and through an electrical conduit. The drum is driven in the opposite direction to retrieve the fish cable. A slip clutch is provided to prevent excessive power being applied to either the drum or the driving rollers and a clutch is used such that either the drum or the driving rollers is connected to the driving means, with the one which is not connected to the driving means being free to turn. A plate is pivotally mounted with one end thereof bearing against the cable on the drum for producing level wind of the cable onto the drum as the drum is rotated also for preventing undesired unwinding of the cable from the drum.

---

A powered fish cable tool is a device which forces a metal cable through an electrical conduit to some destination so that an electrical cable can be connected to the end of the fish cable and pulled through the conduit when the fish cable is retracted by the tool, all of which eliminates costly manual labor to accomplish the same purpose. However, because of the nature of some electrical conduits, especially those presenting a tortuous path, the available fish cable tools are not capable of efficiently accomplishing the purpose for which they are designed. This is apparently so because the available fish cable tools are not designed to handle a large and stiff enough fish cable to negotiate the bends and curves in such conduits. It will be apparent that to provide a fish cable tool which will function to accomplish its purpose when used with all electrical conduits, the tool must be capable of handling sufficiently stiff fish cable, but one which is flexible enough to negotiate the turns in the electrical conduit without doubling on itself and becoming jammed in the electrical conduit. It is one object of this invention to provide such a fish cable tool.

To carry out the above object using the substantially stiff cable that is required, it will be apparent that a sufficiently forceful driving means for the fish cable must be provided, including suitable means for properly containing the fish cable within the fish cable tool when retracted. Along with this, it can be stated that other objects of the invention are to provide an improved driving means for the fish cable and an improved means for containing the cable within the tool. An additional object can be stated as the provision of a fish cable tool that is as mechanically simple as possible to reduce the possibility of malfunctions and to reduce the cost of manufacture of same. In accordance with this, another particular object is to provide an efficient and simplified arrangement for shifting the tool between a forward condition for driving the cable out and a reverse condition for retracting the cable. In accordance with the intent of the invention and to carry out the above objects, the present invention provides a fish cable tool which has an improved driving means for pushing the fish cable through an electrical conduit, which means comprises a pair of gripping pulleys between which the fish cable passes, each of which are power driven, wherein the two pulleys are urged together by suitable biasing means. To properly contain the fish cable within the tool, there is provided a pressure plate and bar which presses down on the cable contained about a reel or drum, wherein this pressure plate and bar are pivoted about a fulcrum point and connected to a lever arm which is resiliently biased to urge the pressure plate and bar against the cable. Because of the mechanical advantage inherent in the use of the lever arm, a very large pressure, if desired, can be exerted against the wound up cable to contain it tightly against the drum. Such a pressure is required when using very stiff cable as noted before. Also, the pressure plate and bar cooperate with the drum to roll the cable into place maintaining a level wound condition and preventing undesired unwinding. Additionally, the invention includes a greatly simplified drive train through which the driving means is operated and, alternatively, the cable drum is turned, which allows the tool to selectively drive the cable out or retrieve the cable, respectively. There is also provided a slip clutch in the drive train for preventing damage to the equipment if the driving force required to move the cable exceeds a safe level.

Many other objects, features and advantages of the invention will become apparent from the following detailed description thereof when taken in conjunction with the appended claims and the attached drawing wherein like reference numerals refer to like parts throughout the several figures, and in which:

FIGURE 1 is a side elevational view of a fish cable tool in accordance with one embodiment of the invention;

FIGURE 2 is a top plan view of the tool shown in FIGURE 1 with the top of the outer casing thereof removed;

FIGURE 3 is a side elevational view in section taken through section lines 3—3 of FIGURE 2;

FIGURE 4 is a side elevational view in section taken through section lines 4—4 of FIGURE 2;

FIGURE 5 is an end elevational view in section taken through section lines 5—5 of FIGURE 3;

FIGURE 6 is an end elevational view in section taken through section lines 6—6 of FIGURE 3;

FIGURE 7 is an exploded view in perspective of a gear arrangement for shifting the tool of FIGURE 1 between forward and reverse and through which the fish cable is driven out and reeled in, respectively;

FIGURE 8 is a perspective view of one embodiment of a fish cable guide attached to the front end of the tool;

FIGURE 9 is a perspective view of another embodiment of a fish cable guide;

FIGURE 10 is a perspective view of one embodiment of a centering device for centering the cable within the electrical conduit, which device also acts as a stop against the cable guide when the cable is reeled in;

FIGURE 11 is a perspective view of another embodiment of a cable centering device;

FIGURE 12 is a side elevation view similar to FIGURE 3, but illustrating a second embodiment of the invention;

FIGURE 13 is a view taken along line 13—13 of FIGURE 12;

FIGURE 14 is a side elevation view similar to FIGURE 13, but taken from the opposite side;

FIGURE 15 is a view taken along line 15—15 of FIGURE 14;

FIGURE 16 is a view similar to FIGURE 15 further illustrating the shifting of a clutch utilized in accordance with a second embodiment of the invention;

FIGURE 17 is an exploded perspective view further illustrating a clutch in accordance with a second embodiment of the invention;

FIGURE 18 is an exploded perspective view illustrating a slip clutch utilized in accordance with the second embodiment of the invention;

FIGURE 19 is a view in elevation illustrating a slip clutch utilized in the present invention; and FIGURE 20 is a view taken along line 20—20 of FIGURE 19.

Referring now to the side elevational view of the fish cable tool shown in FIGURE 1, an outer housing 20 is provided within which there is contained the working mechanisms of the tool and a cable reel about which the cable is wound. A suitable handle or grip 22, such as those provided on other power tools, and an electric motor box 48 are attached at approximately 90° to the housing 20. A trigger 24 is provided for selectively actuating the tool. A cable guide 26 is securely attached to the front end of the tool through which a fish cable 28 passes from the interior of the tool. The cable is suitably hooked or looped at the front end 30 thereof for the attachment thereto of an electrical cable, and to facilitate the travel of the fish cable through an electrical conduit, a centering device 32, to be described later, is attached behind the front end of the cable for centering the cable within the electrical conduit and for acting as a stop to prevent the cable from being completely retracted within the tool through the guide 26. A shifting lever 34 is provided on the exterior of the tool and pivoted from a fulcrum 38 intermediate its two ends. The lower end of the lever 34 is attached to the end of a shaft 36 by means of a suitable bearing so that the shaft can rotate relative to the lever. The shaft passes into the interior of the tool so that the lever can be actuated in one direction to force the shaft inward, which operates a clutch contained within the tool to cause the cable to be driven out when the trigger is pulled. Conversely, when the gear lever 34 is actuated in an opposite direction to force the shaft outward, the clutch is operated to disengage the driving mechanism and cause the cable to be retracted when the trigger is pulled. Bearings, to be shown later, are attached to the outer housing of the tool between bearing plates 42 on which the axle of the cable reel is suspended. A stationary shaft 44 is also secured between the opposite sides of the outer housing to support a pressure plate and bar which is biased against the cable reel, and to support the means for biasing the two gripping and driving pulleys together, all as will be described later. Other bearings 46 are mounted on the opposite sides of the outer housing 20 within which is suspended an axle for carrying one of the gripping pulleys.

Referring now to FIGURE 2, which is a top plan view of the tool shown in FIGURE 1 with the top of the outer housing shown removed, the tool includes a cable drum indicated at 60 supported on an axle 62 mounted at its two ends in bearings 43 and 43', respectively. Forming an integral part of the cable drum on one side thereof is a large toothed gear 64 which engages another smaller gear 66, the latter of which is supported on another axle 68 mounted at its two ends in bearings 40 and 40', respectively. The gear 66 is free to rotate relative to and about the axle 68. A dog 70, also supported on axle 68, is adapted to turn with axle 68 and also to move laterally along the axis thereof in response to the gear lever 34 being actuated, to be described in more detail below. When the top of the gear lever 34 is pushed in toward the tool, the dog 70 is moved laterally on the axle 68 to engage gear 66 to cause the latter to turn with the axle, also as will be described in more detail hereinafter. Another gear 72, rigidly attached to axle 68 for rotation therewith engages a spur gear 71 (shown in FIGURE 3) driven by a motor contained within the motor housing 48. When the trigger 24 is pulled to actuate the motor through electrical connection 25, gear 72 is caused to rotate in a clockwise manner as viewed from the side of the tool, such as seen in FIGURE 3, and the axle 68 to turn therewith. Since gear 66 is free wheeling on axle 68, it will be caused to rotate with the axle only when dog 70 is engaged therewith. Assuming this to be the case, this causes gear 66 to rotate the large gear 64 attached to the cable drum in a counter-clockwise direction and thus to effect the winding of the cable onto the drum to retract it.

Another large gear 76, also supported on the cable drum axle 62 but which is free wheeling thereabout to rotate relative to the cable drum, engages another smaller gear 78 supported on the axle 68, wherein gear 78 is also free to rotate relative to axle 68 as is the case of gear 66. The large gear 76 also engages another small gear at 80, shown in phantom, in the front thereof which in turn engages yet another small gear 82, and the latter of which engages still another gear 84 rigidly mounted on an axle 88. The axle 88 supports the lower of two gripping pulleys for driving the cable out of the tool, wherein this axle is journaled for rotation in bearings 46 and 46' attached to the outer housing of the tool. The upper pulley 98 of the two gripping pulleys is mounted directly above the lower pulley and is caused to be driven in the opposite direction as the lower pulley when the latter is caused to rotate so that both pulleys will be forcing the cable in the same direction. When the gear shift lever 34 is shifted to cause dog 70 to engage gear 78, the lower pulley is caused to rotate through gears 76, 80, 82 and 84 in a clockwise direction as viewed from the side as shown in FIGURE 1, and the top gripping pulley 98 is caused to rotate in a counter-clockwise direction by means of a chain 92 passing over sprockets 94 and 96, and a sprocket (not shown in this figure) that is supported on axle 88 and turns therewith. The sprocket 96 is secured to an axle 100 which also supports the gripping pulley 98, wherein the axle 100 is supported by a yoke 130, the latter of which is pivotally mounted for support at its other end by the shaft 44.

A pressure plate 110 is also pivotally supported at one end on stationary shaft 44, wherein the other end of the pressure plate bears against the cable wound on cable drum 60. The pressure plate includes a lever arm 116 integral therewith which extends down along the side of the large gear 64. A spring 24 is used to bear against lever arm 116 and to urge it downward, thus causing the pressure plate to bear against the cable drum with a counter-clockwise torque as viewed from the side shown in FIGURE 1. The function of the pressure plate is to hold the relatively stiff cable tightly on the drum so that it will not unwind within the tool housing.

One embodiment of a cable guide 26' is shown attached to the front of the tool in line with the driving pulleys, so that guide cable 28 passes out of the tool through the guide and terminates at its end in a loop 30 and centering device 32', to be described below.

The structure and function of the tool which effects the retracting of the cable onto the cable drum will now be described in conjunction with the side elevational view in section of FIGURE 3. It will be seen that a spur gear 71, which is connected to the shaft of the motor within motor housing 48, engages and drives gear 72 as previously noted. Shown in phantom is the smaller gear 66 which engages the large gear 64 secured to one side of the cable drum. As dog 70, shown in FIGURE 2, is caused to engage gear 66, the large gear 64 will be caused to turn in a counter-clockwise direction as viewed in FIGURE 3, thus retracting the cable. The pressure plate and lever structure are also shown in FIGURE 3, wherein it will be recalled from FIGURE 2 that the pressure plate 110 and lever arm 116 are laterally displaced from one another but integrally connected. The pressure plate and lever arm are pivotally mounted on stationary shaft 44 so that the pressure plate 110 extends over the top of the cable drum. At the end of the pressure plate bearing against the cable drum is a round bar member 112 extending the width of the cable drum on which the cable is wound, which bar is secured to the end of the pressure plate by suitable bolts 114 or in any other suitable manner. The rounded surface of the bar bearing against the cable eliminates the possibility of sharp edges cutting into the cable. The lever arm 116 is laterally displaced upon the pressure plate and extends down at an angle on the outside of the large gear 64 but within the outer housing 20. At the end of the lever arm is a boss 117 about which one end of a compression spring 124 is disposed. A spring supporting member or rod 118 is threaded at 119 over a part of the length thereof and securely held within a threaded housing 120, the latter of which is secured to the inner wall of the outer housing 20. The rod is provided with a shoulder 122 against which the other end of the spring abuts, so that the spring tends to urge or bias the lever arm 116 in a counter-clockwise direction. The rod 118 is threadedly engaged within the housing 120 so that the amount of pressure exerted by pressure plate 110 on the cable drum can be varied by screwing the rod in or out of the housing 120.

Although reference will again be had to FIGURE 3 to further describe the operation and structure of the two gripping or driving pulleys mounted within the front end of the tool, reference is now had to the side elevational view in section of FIGURE 4, taken within section lines 4—4 of FIGURE 2, to describe the gears which cause the guide cable to be driven out of the tool. As noted earlier in conjunction with FIGURE 2, gear 78, which is caused to turn in a clockwise direction when in engagement with dog 70, engages the other large gear 76 mounted for rotation about the axle 43, where it will be recalled that the large gear 76 is free to rotate on this axle relative to the drum itself. This large gear engages a smaller gear 80, which in turn engages another gear 82 of the same size which, in turn, engages yet another gear 84 shown in phantom in FIGURE 4. Reference will now be had to all of FIGURES 2–6, wherein FIGURE 5 is a front elevational view in section taken through section lines 5—5 of FIGURE 3, and FIGURE 6 is the front elevational view in section taken through section lines 6—6 of FIGURE 3. From FIGURE 5 it will be seen that the large gear 76 is not attached to the drum 60 itself but is free to turn about the axle 43. Referring to FIGURE 6, it will be seen that gear 84 is rigidly attached to an axle 88, which axle also supports the lower driving pulley 86 for rotation therewith and a first sprocket 90, also for rotation therewith, which is laterally spaced from the first gripping pulley along the axis of the axle. Thus, engagement of the dog 70 with the gear 78 when the motor is running causes the lower driving pulley 86 to rotate in a clockwise direction as shown in FIGURE 3. As shown in FIGURES 3 and 6, a chain 92 is engaged with the sprocket 90 to be driven thereby, wherein the chain passes over two other sprockets 94 and 96. Sprocket 94 is carried for rotation on the bottom of a downward projecting lever member 132 forming an integral part of the yoke member 130 and extending downward therefrom. Sprocket 96 is securely attached to an axle 100, which axle also supports the upper driving pulley 98, and which axle 100 is also supported by the yoke member 130. As the lower driving pulley 86 is caused to rotate in a clockwise direction as shown in FIGURE 3, the upper gripping pulley is caused to rotate in a counter-clockwise direction through sprockets 90, 94, 96 and chain 92. Thus, the cable will be caused to be driven out of the tool by the joint action of the two driving pulleys.

It will be recalled that the yoke member 130, which supports axle 100 on which the top driving pulley 98 and top sprocket 96 are supported, is pivotally supported on stationary shaft 44 for rotation thereabout. Forming an integral part of the yoke member is the downward extending lever member 132 which is adjustably attached to the yoke member by an adjustment screw 134, so that the lever member 132 can be adjusted up and down to vary the distance it extends down in relation to the yoke member. The downward extending lever member 132 is provided with a beveled surface 136 at the bottom thereof, and the lower sprocket 94 is attached adjacent the lower end of the lever member through an axle 137 shown in FIGURE 6. Another spring 140, restrained at one end within a housing 142 secured to the outer container by bolts 144, abuts the beveled surface 136 of the lever member at its other end, thus tending to cause the lever member 132 and yoke member 130 supporting the top driving pulley to rotate in a clockwise direction as viewed in FIGURE 3. This biasing action causes the two driving pulleys to be urged together at all times so that the guide cable can be tightly gripped to drive it out of the tool, and so that different sized cables can be used in conjunction with the tool. Moreover, as the lever and yoke members are caused to rotate by incremental amounts, pulleys 94 and 96 are caused to be rotated accordingly, thus maintaining a substantially constant tension in chain 92.

Referring briefly to FIGURE 5, the position of the pressure plate 110 and bar 112 in relation to the cable drum can be seen. This figure also shows the large gear 64 which acts to retract the cable, securely attached to the side of the cable drum by screws 65 or other suitable means. The orientation of the lever bar 116 for biasing the pressure plate is also shown (in section) laterally displaced from the cable drum, with the housing 120 holding the adjustment screw 119 also secured to the inner wall of the outer housing 120. The gear shift 134 is also shown pivotally mounted at fulcrum 38 for causing shaft 36 to be moved in and out of the tool to actuate dog 70. It will be appreciated that the shaft 36 is journaled at its end within a suitable bearing, or bushing, 37 at the lower end of the lever 34, so that the shaft will be free to rotate therewithin but will be moved in and out in response to actuation of the lever.

The gear arrangement for shifting the tool between forward and reverse is shown in the perspective, exploded view of FIGURE 7. As described in FIGURE 2, the axle 68 carries gear 72 and dog 70 for rotation therewith, and additionally supports gears 66 and 78 with the latter two being free to rotate relative to the axle. Large gear 72, which engages the spur gear of the motor, is securely attached about the axle 68 for rotation therewith by means of slots 150 and 151 in the gear and axle, respectively, which receives a key 152 to prevent relative movement between the gear and the axle. Smaller gear 66, which engages the large cable drum gear 64, is positioned over the axle 68 between gear 72 and the center of the axle. This smaller gear 66 is free to rotate about and relative to the axle 68. A dog 70 is positioned over axle 68 and coupled thereto by spline 71 to prevent rotation of the dog relative to the axle. The spline 71, rigidly secured to the axle 68, is fitted within a groove in the dog, (not shown), whereby the dog is free to move laterally along the spline and axis of axle 68. The other smaller gear 78 is positioned over the other end of the axle and is free to rotate thereabout, as is gear 66. Shaft 36, having a threaded hole 158 in one end thereof, is fitted within an elongated hole 156 defined in the center of axle 68 concentric with the center line thereof. A screw or bolt 160 is then passed through an opening or slot 164 in the dog, an elongated slot 162 in the axle which communicates with hole 156, and screwed into the hole 158 of shaft 36. Shaft 36 is connected at its outer end to the lever arm 34, so that actuation of the gear arm causes the shaft to be moved within axle 68 along the center line thereof. This movement also causes dog 70 to be moved laterally along the axle by virtue of screw 160 connected between the dog and the shaft. As the shaft is withdrawn from the axle, the dog 70, which has shoulders or teeth 170, engages the opposite shoulders or teeth 166 of gear 66, thereby causing gear 66 to rotate with axle 68 and gear 72. Moving the shaft into the axle to its extreme moves dog 70 in engagement with gear 78, so that the shoulders 72 on the other side of the dog engage opposing shoulders 176 on gear 178. This causes gear 78 to turn with the axle and disengages gear 66.

It will be apparent from the following description that the combination of gear 78, gear 76, gear 80, gear 82 and gear 84 can be considered as a first driving means for driving the cable out of the tool, whereby it will be apparent that this means can be replaced by suitable sprocket and a chain. In particular, a freely rotatable sprocket on axle 68, a sprocket rigidly attached to axle 88 and a chain are suitable for this purpose, wherein it will be recognized that a sprocket and chain arrangement has the advantage of greater strength and driving force, and less wear. Such an arrangement is provided in the embodiment shown as used as another driving means for the top driving pulley. Similarly, the large gear 64 and gear 66 can be replaced by a sprocket and chain arrangement, if desired.

One embodiment of a cable guide attached to the front of the tool is shown in FIGURE 1, which embodiment comprises a hollow cylindrical member attached by any suitable means to the front end of the tool in line with the passage of the cable between the two driving pulleys, with the guide cable passing through the front guide 26. This guide simply permits the guide cable to be properly aimed and guided toward the electrical conduit and can be inserted in the conduit itself if so desired. Another cable guide 26' is shown in the perspective view of FIGURE 8 and comprises a pair of opposing elongated side members 178 connected in the center by a bottom or floor member 184. The elongated members are supported from an integral end mounting plate 180 with a hole 182 defined therethrough just above the bottom plate 184 through which the cable passes. At the end of the guide in line with the surface of the bottom plate 184 is a roller 186 over which the cable passes. In operating the tool, it is sometimes desirable to hold the front end of the tool in a slight elevation with respect to the electrical conduit in order to put more tension in the guide cable. In so doing, the roller 186 at the end of the guide reduces friction as the cable passes over the end of the guide. A similar guide 190 is shown in the perspective view of FIGURE 9 and inclues another mounting plate 194 to which is attached at one end an elongated trough member 192 for guiding the cable. Another hole 196 is defined in the mounting plate through which the cable passes and a roller member 198 is provided at the end of the guide over which the cable passes.

The centering member 32 referred to in FIGURE 1 is shown in the perspective view of FIGURE 10 and comprises four resilient arms 200 supported from an annular header 202 through which a hole 201 is defined for the passage of the cable therethrough. A set screw 203 is provided in the header to secure it to the cable so that the centering member moves therewith. This centering member serves to more or less center the cable within the electrical conduit to allow the guide cable to negotiate more easily the turns within the electrical conduit and also acts as a stop when the guide cable is retracted into the tool. In other words, the centering member will finally be caused to abut against the cable guide 26 to prevent the cable from being completely reeled within the cable guide. Another embodiment of the centering member is shown in the perspective view of FIGURE 11 at 32', and comprises a plurality of resilient arms 210 mounted between opposite headers 212 and 214.

Each of the headers 212 and 214 are provided with centrally disposed, axially aligned apertures 216 and 218, respectively, through which cable 20 passes. One of the headers, suitably header 212, is drilled and tapped for purposes of receiving a set screw 220 for rigidly connecting the centering member to the cable 20.

Turning now to FIGURES 12–20 of the drawings, there is shown still a second embodiment of a fish tape tool in accordance with the present invention especially adapted for use with a reversible motor. Thus, the apparatus in accordance with the second embodiment of the invention is similar to that described with reference to FIGURES 1–12 in that there is provided a motor 48 adapted to drive a spur gear 71. However, the motor 48 is suitably operated by a switch 250 such that when the switch 250 is operated in one direction, the spur gear 71 will be driven in a clockwise direction, as viewed in FIGURE 14, and when it is operated in the opposite direction, the spur gear 71 will be driven in a counter-clockwise direction.

The tool in accordance with the second embodiment of the invention also includes a drum 60 that is journaled for rotation on shaft 62 for containing the cable 20 with a bar member 112 bearing against the cable to prevent unwinding and also to roll the cable into place on the drum, maintaining a level wound condition. The drum 60 is rotated in a clockwise direction, as viewed in FIGURE 12, to retrieve the cable 20, and rollers 86 and 98 are driven for purposes of driving the cable from the drum 60.

The spur gear 71 engages gear teeth 252 formed in the outer periphery of a slip clutch member, designated generally by the reference character 254. The slip clutch 254 is keyed for rotation with shaft 256 that is journaled for rotation in bearings 258 and 258'. There is also provided a member 260 having shoulders 262 formed in one side thereof. Each of the faces 264 extend from one side of one shoulder 262 to the opposite side of the opposite shoulder 262 and a sprocket 266 is connected to the opposite side of the member 260.

There is also provided a similar member 270 having shoulders 272 formed in one side thereof with sprocket gear 276 attached to the opposite side. Member 272 also includes faces 274 shaped similarly to the faces 264 of member 260. Member 270 is also journaled for rotation on the shaft 256. A dog member 280 having shoulders 282 formed in one side thereof and shoulders 284 formed in the opposite side is provided. Slots 286 are formed in the inner surface of the dog for engaging splines 288 formed on shaft 256 whereby the dog 280 can move axially along the shaft 256, but is keyed for rotation therewith.

The separation of the members 260 and 270 on shaft 256 is such that when the dog 280 is completely engaged with one of the members 260 or 270, it will turn free of the other members. The clutch is self shifting in accordance with the direction of rotation of the shaft 256. Thus, if the shaft 256 is caused to rotate in a clockwise direction, as viewed in FIGURE 14, the faces 290 of the dog 280 will bear against the faces 274 of the member 270, producing a camming action to cause the dog 280 to move toward member 260. After approximately one-half of a revolution of shaft 256, dog 280 will be moved out of engagement with member 270 and into complete engagement with member 260. This operation is illustrated in FIGURE 15 of the drawings. On the other hand, if the shaft 256 turns in a counter-clockwise direction, as viewed in FIGURE 14, the faces 292 of dog 280 will bear against faces 264 of member 260, providing a camming action to cause the dog 280 to move into engagement with member 270, with the shoulders 272 bearing against shoulders 282.

There is also provided a sprocket 300 that is mounted to the side of the drum 60. Chain 302 couples the sprocket 276 to sprocket 300, such that when the shaft 256 is rotated in the direction shown in FIGURE 16, the drum 60 will, as viewed in FIGURE 12, rotate in a clockwise direction to reel cable 20 onto drum 60. There is also provided a sprocket 304 which is keyed for rotation with shaft 88, the shaft 88 being journaled for rotation in bearings 46 and 46'. Sprocket 304 is connected to sprocket 266 by chain 306 such that rotation of shaft 256 in a counter-clockwise direction, as viewed in FIGURE 12, will be effective to cause shaft 88 to also move in a counter-clockwise direction, driving rollers 86 and 98 to pull cable 20 from the drum 60 and drive it away from the machine.

The driving arrangement is shown in greater detail in FIGURE 13 of the drawings, wherein it can be seen that roller 86 has a spur gear 310 mounted to one side thereof, the roller 86 and gear 310 being keyed for rotation with shaft 88. There is also provided a member 130' similar to that described with reference to FIGURE 2 of the drawings which is pivotally mounted at one end for pivotal movement about shaft 44. The opposite end of member 130 is slotted for receiving roller 98 having spur gear 312 connected to one side thereof, the roller 98 and gear 312 being journaled for rotation on a shaft 314 which extends across the slot formed in member 130'. The relative position of the roller 98, gear 312, roller 86 and gear 310 is that gears 310 and 312 will be in engagement with rollers aligned such that rotation of roller 86 and gear 310 responsive to shaft 88 being driven will cause rotation of the gear 312 and roller 98.

Members 320 are positioned on opposite sides of roller 86 of the shaft 88 passing through one end thereof. Members 320 are each formed with a threaded and tapped hole 322 in its upper end adapted to receive a stud 324. The arms formed in the member 130' are each provided with holes 326 through which studs 324 pass, with springs 328 biasing roller 98 carried by member 130' toward roller 86 whereby the rollers 86 and 98 each bear against cable 20 with a desired degree of force.

Pressure plate 110' which carries the bar member 112 bears against cable 20 to hold it onto the drum 60 is pivotally mounted to shaft 44, but includes a forwardly extending portion 340. The case of the tool includes a front plate member 342 and elongated member 344 is mounted to the front plate member 342, the member 344 having a vertically disposed threaded hole 346 extending therethrough. Positioned within the hole 346 is a set screw 348 and a coil spring 350. A spring 350 bears against the end 340 of the member 110' to bias the member 112 against drum 60. Ball bearing 352 is suitably positioned between the spring 350 and the end 340, with the end 340 including a depression 354 for receiving the bearing 352. In order to adjust the force with which the rod member 112 bears against the cable 20 for holding it onto the drum 60, the position of the screw 348 relative to the member 346 is adjusted to thereby increase or decrease the tension with which the spring member 350 bears against the end 340 of the member 110.

From the above, it will be seen that operation of the fish tape tool in accordance with this embodiment of the invention is a function of the position of switch 250 of motor 48. Thus, if switch 250 is operated to cause the motor to drive the shaft 256 in the direction shown in FIGURE 16 of the drawings, the dog member 280 will automatically be cammed into a position such that shoulders 282 of dog member 280 engage shoulders 272 of member 270, causing sprocket 276 to rotate in the direction of the shaft. Upon this occurrence, the drum 60 will be driven in a counter-clockwise direction, as viewed in FIGURE 14, causing cable 20 to be wound up onto the drum. Rod member 112 is biased against the drum 60 by spring 350, preventing any tendency of the cable 20 to unwind about the drum 60 and also insuring that the cable will be rolled onto the drum in place, maintaining a level wound condition. At such time as the motor 48 is stopped, member 110 also provides a braking function, reducing any tendency of the drum 60 to continue to rotate when power is removed from the motor 48 due to the inertia of the drum.

On the other hand, if the shaft 256 is driven in a counter-clockwise direction, as viewed in FIGURE 14, and as shown in FIGURE 15, the camming action between the surfaces 274 and 290 will cause the member 280 to move axially along the shaft 256 until the shoulder 284 of member 280 engages shoulders 262 of member 260, causing sprocket 266 to also move in a counter-clockwise direction. As sprocket 266 is turned in a counter-clockwise direction, chain 306 will be driven to drive sprocket 304 in a counter-clockwise direction, as viewed in FIGURE 12, causing cable 20 to be driven from the drum. It will also be noted that as the sprocket 304 moves in a counter-clockwise direction, so will the gear 310 and roller 86. On the other hand, due to engagement between gear 310 and gear 312, the gear 312 and roller 98 will each move in a clockwise direction. Rollers 86 and 98 each bear against the cable 20, causing it to be driven from the machine responsive to rotation of the shaft 256 in a counter-clockwise direction, as viewed with respect to FIGURE 12.

The direction of movement of cable 20 is therefore controlled solely by the operation of the switch 250, it not being necessary to operate a gear lever. However, if the motor should not be stopped before the end of the cable arrives at the machine, or if the conduit being pulled should stick, either the motor or the machine, or both, can be damaged. Accordingly, member 252 is constructed such that when the torsional forces exerted on the shaft 256 attain a maximum desired level, the motor 48 will continue to drive the spur gear 71 without attendant rotation of the shaft 256, thereby preventing unnecessary stresses being applied to the motor and the drive train of the machine.

The construction of a preferred embodiment of the member 254 is shown in FIGURES 18–20 and can be seen to comprise ring gear 400 having teeth 252 formed in its outer periphery for engagement with spur gear 71. Ring gear 400 is formed with an inner flange member 402, suitably having axially arranged, drilled and tapped holes 404. There is also provided an annular plate member 406 having a reduced diameter portion 408 adapted to fit within the ring gear 400. A plurality of holes 408 are formed in the plate member 406 through which screws 410 pass for connecting the plate member 406 to the ring gear 400 to provide a single unitary structure.

A plurality of radially disposed symmetrically arranged holes 412 are formed in the plate member 406. In the specific embodiment shown, four such radially disposed holes are formed, although a greater or lesser number can be utilized. Each of the holes 412 intersect both the inner and outer diameters of the annular plate member 406. At least the outermost portion of the radially extending holes is suitably tapped to provide threads. The centrally disposed opening 414 of the annular plate member 406 is adapted to receive a second annular member 416. The annular member 416 has an inner diameter 418 which receives the shaft 256, a slot 420 being formed in the inner surface for receiving a key 422 which also engages a slot 424 formed in the shaft 256 for purposes of connecting the annular member 416 to the shaft. The periphery of the annular member 416 is shaped to define a concave groove 430, with four hemispherical detentions 432 formed in the bottom of the groove and positioned to align with the radially extending holes 412 formed in the plate number 406.

In assembly of the device, the annular member 416 is positioned within the plate member 406 and one of the balls 440 is dropped in each of the radially extending holes 412. A spring 442 is positioned on top of the ball bearing and a set screw 444 is screwed into the hole for purposes of establishing the force biasing the ball 440 against the annular member. As the annular member is turned, a point will be reached in which one of the ball bearings will be positioned in each of the hemispherical depressions as shown in FIGURES 19 and 20.

Thereafter, as the ring gear 400 is driven by spur gear 71, the ring gear will be coupled to the shaft 256 through the action of the balls 440 engaging the hemispherical depressions 432 formed in the periphery of the annular member 416. However, if the load on the shaft 256 becomes sufficiently great, sufficient force will be imposed against the balls to cause them to press outward against the springs 442, riding out of the hemispherical slots and moving along the concave groove 430 formed in the periphery of the annular member 416. The maximum amount of load that will be imposed on the motor, or any other component of the tool, is therefore a function of the force with which the springs 442 bias the balls 440 against the annular member 416.

Although the invention has been described with reference to particular preferred embodiments thereof, many changes and modifications will become apparent to those skilled in the art in view of the foregoing description which is intended to be illustrative and not limiting of the invention defined in the appended claims.

What is claimed is:

1. A fish cable tool comprising:
   (a) a rotatable drum about which a fish cable can be wound;
   (b) a driving source;
   (c) first driving means;
   (d) a first driving pulley disposed in front of said drum for engaging said cable coupled to said first driving means for being driven thereby in one rotational sense to drive said cable out of said tool when said first driving means is actuated;
   (e) a second driving pulley disposed adjacent said first driving pulley for engaging said cable in gripping relationship with said first pulley;
   (f) second driving means coupled between said first driving means and said second pulley for driving said second pulley in an opposite rotational sense to said first pulley in response to said first driving means being actuated;
   (g) third driving means coupled to said drum for driving said drum in a rotational direction to retract said cable into said tool and wind it about said drum;
   (h) clutch means for selectively coupling said driving source with said first driving means and said third driving means for the alternative actuation thereof, respectively, said drum being freely rotatable when the said first driving means is not coupled to said driving force and said first and second driving pulleys being freely rotatable when said third driving means is not coupled to a said driving source;
   (i) first means for urging said first and second driving pulleys together; and
   (j) a plate member pivotally supported with one end thereof bearing against said cable on said drum and means biasing said one end toward said drum for producing level winding of said cable onto said drum when said drum is driven and for preventing undesired rotation of said drum when said first and second driving pulleys are driven.

2. A fish cable tool according to claim 1 wherein said clutch means comprises a dog member for being alternatively engaged with said first and said third driving means.

3. A fish cable tool according to claim 1 wherein said second driving means comprises the combination of a plurality of sprockets and a chain engaged thereby for reversing the direction of rotation of said second pulley in relation to said first pulley.

4. A fish cable tool comprising:
   (a) a rotatable drum about which a fish cable can be wound;
   (b) a driving source;
   (c) first driving means;
   (d) a first driving pulley disposed in front of said drum for engaging said cable coupled to said first driving means for being driven thereby in one rotational sense to drive said cable out of said tool when said first driving means is actuated;
   (e) a second driving pulley disposed adjacent said first driving pulley for engaging said cable in gripping relationship with said first pulley;
   (f) second driving means coupled between said first driving means and said second pulley for driving said second pulley in an opposite rotational sense to said first pulley in response to said first driving means being actuated;
   (g) third driving means coupled to said drum for driving said drum in a rotational direction to retract said cable into said tool and wind it about said drum;
   (h) clutch means for selectively coupling said driving source with said first driving means and said third driving means for the alternative actuation thereof, respectively;
   (i) a support member pivotally mounted at one end for rotatably supporting said second pulley at the other end thereof;
   (j) a lever member rigidly attached to support member; and
   (k) spring means engaging said lever member tending to rotate said support member in a sense to urge the second pulley against said first pulley.

5. A fish cable tool comprising:
   (a) a rotatable drum about which a fish cable can be wound;
   (b) a driving source;
   (c) first driving means;
   (d) a first driving pulley disposed in front of said drum for engaging said cable coupled to said first driving means for being driven thereby in one rotational sense to drive said cable out of said tool when said first driving means is actuated;
   (e) a second driving pulley disposed adjacent said first driving pulley for engaging said cable in gripping relationship with said first pulley;
   (f) second driving means coupled between said first driving means and said second pulley for driving said second pulley in an opposite rotational sense to said first pulley in response to said first driving means being actuated;
   (g) third driving means coupled to said drum for driving said drum in a rotational direction to retract said cable into said tool and wind it about said drum;
   (h) clutch means for selectively coupling said driving source with said first driving means and said third driving means for the alternative actuation thereof, respectively;
   (i) a first member pivotally mounted at one end bearing against said cable on said drum at the other end thereof;
   (j) a second lever member rigidly attached to said first member; and
   (k) spring means engaging said lever member tending to urge said first member against said cable of said drum.

6. A fish cable tool comprising:
   (a) a rotatable drum about which a fish cable can be wound;
   (b) a driving source;
   (c) first driving means;
   (d) a first driving pulley disposed in front of said drum for engaging said cable coupled to said first driving means for being driven thereby in one rotational sense to drive said cable out of said tool when said first driving means is actuated;
   (e) a second driving pulley disposed adjacent said first driving pulley for engaging said cable in gripping relationship with said first pulley;
   (f) second driving means coupled between said first driving means and said second pulley for driving said second pulley in an opposite rotational sense to said first pulley in response to said first driving means being actuated;
   (g) third driving means coupled to said drum for driving said drum in a rotational direction to retract said cable into said tool and wind it about said drum;
   (h) clutch means for selectively coupling said driving source with said first driving means and said third driving means for the alternative actuation thereof, respectively;
   (i) a shaft;

(j) a support member pivotally supported at one end from said shaft and rotatably supporting said second driving pulley at the other end thereof;

(k) a first lever member rigidly attached at one end to said support member adjacent said shaft;

(l) first spring means engaging the other end of said first lever member tending to rotate said support member in a sense to urge said second pulley against said first pulley;

(m) a plate member pivotally supported at one end from said shaft and bearing against said cable on said drum at the other end thereof;

(n) a second lever member rigidly attached at one end to said plate member adjacent said shaft; and (o) a second spring means engaging the other end of said second lever member tending to urge said plate member against said cable on said drum.

7. A fish cable tool according to claim 6 wherein said first and said second spring members are selectively adjustable to vary the pressure with which said first and said second pulleys are urged together and the pressure which said plate member bears against said cable on said drum.

8. A fish cable tool according to claim 4 wherein said first driving means includes a first axle for being rotated upon the actuation of said first driving means, and said first pulley is secured to said first axle for rotation therewith, including a second axle secured to said second pulley and rotatably supported on said other end of said support member, wherein said second driving means comprises a first sprocket secured to said second axle, a second sprocket rotatably mounted on said lever member, a third sprocket secured to said first axle for rotation therewith, and an endless chain engaging each of said first, said second and said third sprockets for the rotation of said first sprocket in an opposite sense to said second sprocket in response to the rotation of said first axle when said first driving means is actuated.

9. A fish cable tool according to claim 1 including an axle for rotatably supporting said cable drum, wherein said third driving means includes gear means rigidly secured to said cable drum on one side thereof for rotating said cable drum in response to the actuation of said third driving means.

10. A fish cable tool according to claim 1 including a cable guide disposed in front of said first and said second driving pulleys through which said cable passes.

11. A fish cable tool according to claim 10 including a fish cable attached to said drum which passes between said first and said second driving pulleys and through said cable guide, including means rigidly attached adjacent the end of said cable exterior to said guide for substantially centering said fish cable in an electrical conduit.

12. A fish cable tool comprising:
(a) a rotatable drum about which a fish cable can be wound;
(b) a driving source;
(c) first driving means;
(d) a first driving pulley disposed in front of said drum for engaging said cable coupled to said first driving means for being driven thereby in one rotational sense to drive said cable out of said tool when said first driving means is actuated;
(e) a second driving pulley disposed adjacent said first driving pulley;
(f) second driving means coupled between said first driving means and said second pulley for driving said second pulley in an opposite rotational sense to said first pulley in response to said first driving means being actuated;
(g) third driving means coupled to said drum for driving said drum in a rotational direction to retract said cable into said tool and wind it about said drum; and
(h) clutch means for selectively coupling said driving source with said first driving means and said third driving means for the alternative actuation thereof, respectively;
(i) said clutch means including an axle, first and second spaced apart members supported on said axle for relative rotation therewith and coupled to said first and said third driving means, respectively, a third member coupling said axle with said driving source for rotating said axle, a dog supported on said axle for rotation therewith and being movable along said axle for selectively engaging either of said first and said second members to actuate said first and said third driving means, respectively, and means for moving said dog along said axle to selectively engage said dog with either of said first and said second members.

13. A fish cable tool according to claim 12 wherein each of said first, said second and said third members comprises gear means, and each of said first and said second driving means comprises gear means.

14. A fish cable tool according to claim 12 including a second axle supporting said cable drum, wherein each of said first, said second and said third members comprises gear means, said first driving means includes a first gear supported on said second axle for relative rotation therewith, and said third driving means includes a second gear means rigidly secured to said cable drum.

15. A fish cable tool comprising:
(a) a first axle;
(b) a rotatable cable drum supported on said first axle about which a fish cable can be wound;
(c) a driving source;
(d) a second axle;
(e) first and second spaced apart members supported on said second axle for relative rotation therewith;
(f) a third member coupling said second axle with said driving source for rotating said axle;
(g) a dog supported on said second axle for rotation therewith and being movable along said axle for selectively engaging either of said first and said second members to cause rotation thereof, respectively;
(h) means for moving said dog along said second axle to selectively engage said dog with either of said first and said second members;
(i) a fourth member mounted for rotation on said first axle rigidly secured to said cable drum and engaging one of said first and said second members for being driven thereby;
(j) a third axle including a fifth member rigidly secured thereto for rotating said third axle;
(k) a first driving pulley secured to said third axle for rotation therewith for engaging said cable;
(l) a second driving pulley disposed adjacent said first driving pulley for engaging said cable in gripping relationship with said first driving pulley;
(m) means for coupling said fifth member and the other of said first and said second members for rotating said third axle;
(n) means coupled between said third axle and said second driving pulley for driving said second driving pulley in an opposite rotational sense to said first pulley;
(o) first means comprising:
 (1) a support member pivotally mounted at one end for rotatably supporting said second driving pulley at the other end thereof;
 (2) a first lever member rigidly attached to said support member; and
 (3) first spring means engaging said lever member tending to rotate said support member in a sense to urge said second driving pulley against said first driving pulley; and
(p) a second means comprising:
 (1) a plate member pivotally supported at one end and bearing against said cable on said drum at the other end thereof;

(2) a second lever member rigidly attached at one end to said plate member; and (3) second spring means engaging the other end of said second lever member tending to urge said plate member against said cable on said drum.

16. A fish cable tool comprising:
(a) a rotatable drum about which a fish cable can be wound;
(b) a driving source;
(c) first driving means;
(d) a first driving pulley disposed in front of said drum for engaging said cable coupled to said first driving means for being driven thereby in one rotational sense to drive said cable out of said tool when said first driving means is actuated;
(e) a second driving pulley disposed adjacent said first driving pulley for engaging said cable in gripping relationship with said first pulley;
(f) second driving means coupled between said first driving means and said second pulley for driving said second pulley in an opposite rotational sense to said first pulley in response to said first driving means being actuated;
(g) third driving means coupled to said drum for driving said drum in a rotational direction to retract said cable into said tool and wind it about said drum; and
(h) clutch means for selectively coupling said driving source with said first driving means and said third driving means for the alternative actuation thereof, respectively;
(i) said clutch means including means responsive to the direction of rotation of the driving source for selectively engaging a dog member with said first and third driving means.

17. A fish cable tool as defined in claim 1 further including slip clutch means coupled to said driving source for limiting the power applied to said first and third driving means.

18. A fish cable tool comprising:
(a) a rotatable drum about which a fish cable can be wound;
(b) a driving source;
(c) first driving means;
(d) a first driving pulley disposed in front of said drum for engaging said cable coupled to said first driving means for being driven thereby in one rotational sense to drive said cable out of said tool when said first driving means is actuated;
(e) a second driving pulley disposed adjacent said first driving pulley for engaging said cable in gripping relationship with said first pulley;
(f) second driving means coupled between said first driving means and said second pulley for driving said second pulley in an opposite rotational sense to said first pulley in response to said first driving means being actuated;
(g) third driving means coupled to said drum for driving said drum in a rotational direction to retract said cable into said tool and wind it about said drum; and
(h) clutch means for selectively coupling said driving source with said first driving means and said third driving means for the alternative actuation thereof, respectively;
(i) said clutch means including an axle, first and second spaced apart members positioned on said axle for relative rotation therewith and coupled to said first and third driving means, respectively, a third member coupling said axle with said driving source for rotating said axle, a dog supported on said axle for rotation therewith and being movable along said axle for selectively engaging one of said first and second members to actuate said first and third driving means, respectively, said dog and said first and second members each having opposing surfaces shaped to define cams and shoulders whereby rotation of said axle in one direction will cause interaction of the camming surfaces of said dog and said first member to move said dog along said axle out of engagement with said first member and interengagement with said second member to drive said drum in a rotational direction to retract said cable into said tool and wind it about said drum, and whereby rotation of said axle in another direction will cause interaction of the camming surfaces of said dog and said second member to move said dog along said axle out of engagement with said second member and into engagement with said first member to drive said first and second driving pulleys in a direction to drive said cable from said tool.

19. A fish cable tool as defined in claim 1 including a hardened rod member connected to said one end for contacting said cable.

20. A fish cable tool as defined in claim 18 wherein said third member is a slip clutch.

21. A fish cable tool comprising:
(a) a rotatable drum about which a fish cable can be wound;
(b) a driving source;
(c) first driving means;
(d) a first driving pulley disposed in front of said drum for engaging said cable coupled to said first driving means for being driven thereby in one rotational sense to drive said cable out of said tool when said first driving means is actuated;
(e) a second driving pulley disposed adjacent said first driving pulley for engaging said cable in gripping relationship with said first pulley;
(f) second driving means coupled between said first driving means and said second pulley for driving said second pulley in an opposite rotational sense to said first pulley in response to said first driving means being actuated;
(g) third driving means coupled to said drum for driving said drum in a rotational direction to retract said cable into said tool and wind it about said drum;
(h) clutch means for selectively coupling said driving source with said first driving means and said third driving means for the alternative actuation thereof, respectively;
(i) said first driving pulley being mounted for rotation with a first shaft and said second driving pulley being mounted for rotation on a second shaft;
(j) a support member pivotally mounted at one end for supporting said second shaft at the other end;
(k) a connecting member through which said first shaft passes with said first shaft being journaled for rotation in said connecting member; and
(l) a stud carrying a spring, said stud passing through said support member to threadedly engage said connecting member with said spring biasing said first and second driving pulleys toward each other.

References Cited

UNITED STATES PATENTS

| | | | |
|---|---|---|---|
| 1,761,592 | 6/1930 | Seidel | 254—134.3 X |
| 2,416,585 | 2/1947 | Holub | 242—156.1 |
| 2,750,151 | 6/1956 | Fowler et al. | 254—134.3 |
| 2,872,130 | 2/1959 | Nardone | 254—175.7 X |
| 3,145,972 | 8/1964 | Sweeney | 254—134.3 |

FOREIGN PATENTS 565,182  11/1932  Germany.

OTHELL M. SIMPSON, *Primary Examiner.*